Figure 1:
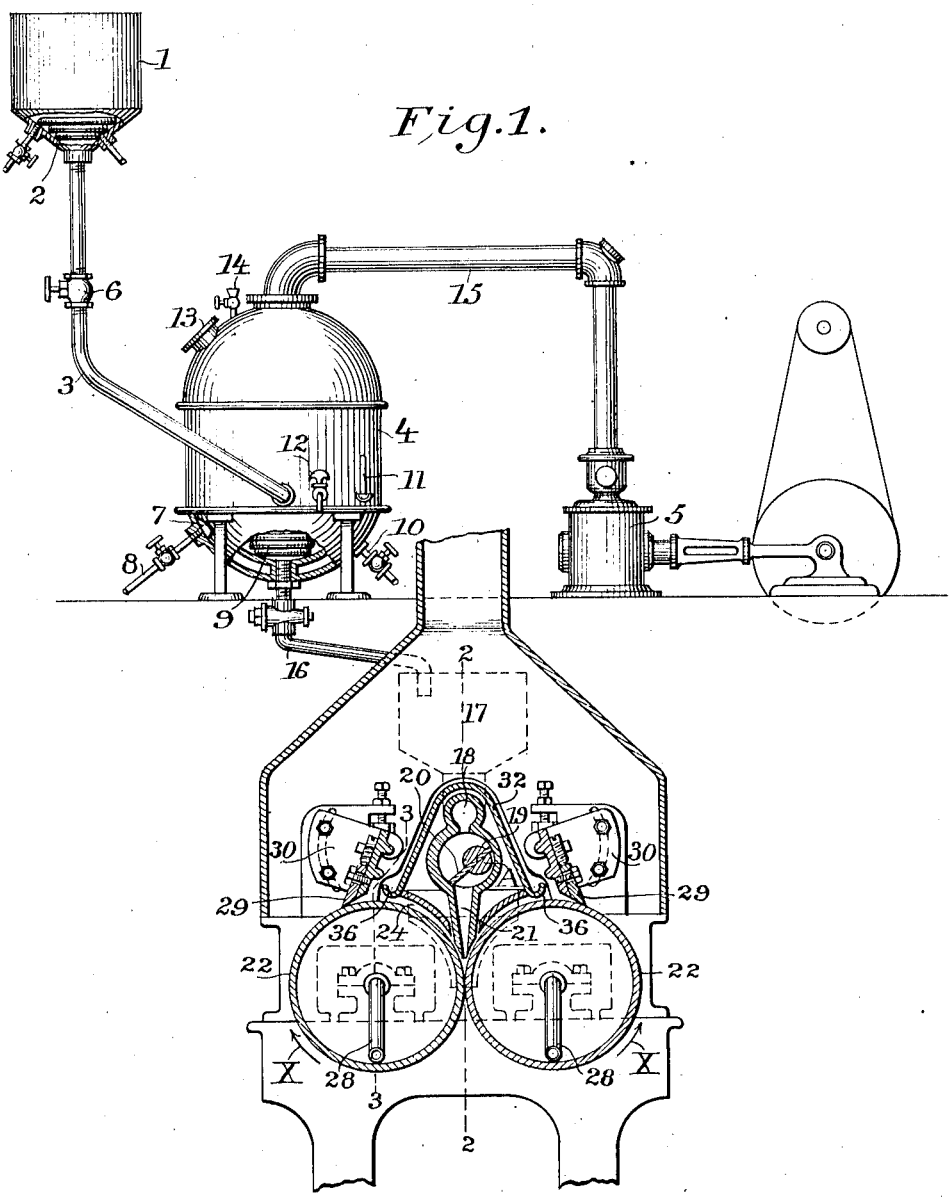

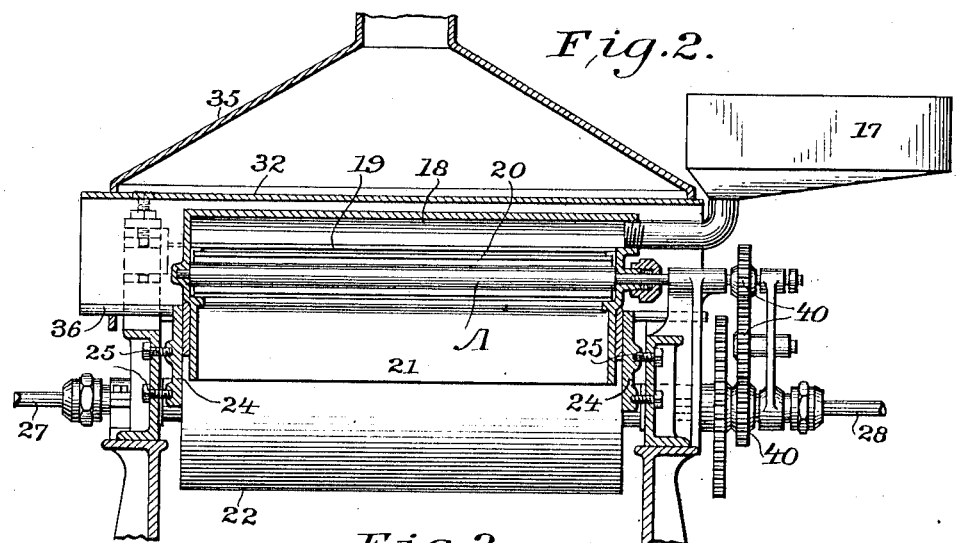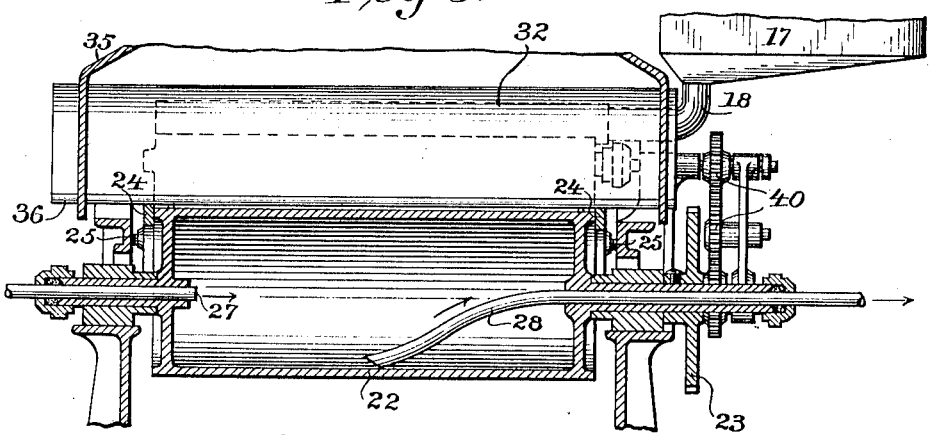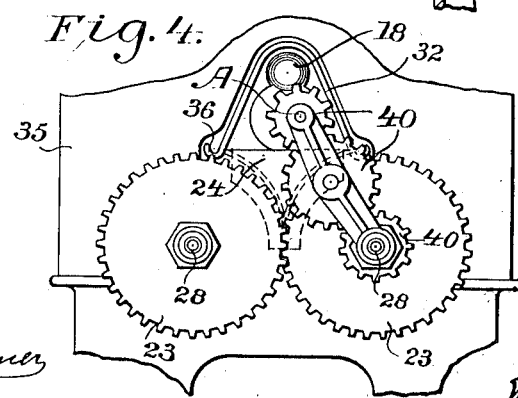

ized to an improved
UNITED STATES PATENT OFFICE.

LEWIS C. MERRELL AND IRVING S. MERRELL, OF SYRACUSE, NEW YORK, ASSIGNORS TO MERRELL-SOULE COMPANY, OF SYRACUSE, NEW YORK, A CORPORATION OF NEW YORK.

PROCESS OF DESICCATING MILK.

1,048,463.   Specification of Letters Patent.   Patented Dec. 24, 1912.

Application filed April 29, 1911. Serial No. 624,185.

*To all whom it may concern:*

Be it known that we, LEWIS CHARLES MERRELL and IRVING S. MERRELL, of Syracuse, Onondaga county, New York, have invented a new Process of Desiccating Milk, of which the following is a specification.

This invention relates to an improved method of separating and removing the moisture constituent of milk for the purpose of recovering and preserving the milk solids in dry form, deprived of the moisture.

It has hitherto been proposed to dry the solids of milk by drawing the milk in a thin sheet or film onto a heated surface and subsequently removing the solids when apparently still moist and somewhat tenacious, the milk being simultaneously boiled violently upon the said heated surface to cause it to coat onto the said surface and be drawn out in a thin sheet film, as is illustrated in United States Letters Patent granted to Merrell and Gere, No. 631,568 dated August 22, 1899, or as in United States Letters Patent granted to Just No. 712,545 dated November 4, 1902.

We have discovered that the thickness of the film of the dried solids, the dryness of this film and the tenacity with which it clings to the heated surface, are each dependent upon the thickness of the milk. We have also discovered that the thicker and heavier the milk, the thicker is the film of dried solids and the less tenaciously does it cling to the heated surface for the reason that it lessens the tendency to bake on. A thick film of dried solids produced from thick milk is also much drier when ready for removal from the heated surface, than a thinner film from thin milk, owing to the fact that there is very much less moisture to expel between the time when the solids are drawn onto the heated surface and the time when they are subsequently removed.

The present process consists in reducing the solids to dry form upon a heated surface, the milk having been previously concentrated or condensed by removing part of its moisture, and this concentrated or condensed liquid being drawn in a sheet or film onto a heated surface, from which the film is subsequently removed in the form of dry flakes or sheets. By this process a substantial portion of the moisture of the milk is first removed, thereby concentrating or condensing the milk, and when the concentrated or condensed milk is subsequently brought in contact with the heated surface it at once coats on in a comparatively thick film, which, when ready for removal is practically dry and non-tenacious, so that the film of dry solids will curl up and partially peel itself from the heated surface, and is therefore, very easily removed; contrasting in a marked degree in this respect with the thin film produced from the normal thin milk, which bakes on tenaciously and is removed with great difficulty.

The rapid boiling, which is an essential feature, causes changes in the physical and chemical structure of milk when supplied in its normal condition, owing to the violence of the boiling and the length of time during which the milk is necessarily subjected to heat to evaporate the water. The condensed or concentrated milk, owing to its increased density, does not boil violently, and in some cases there is little or no apparent ebullition, for the milk is sufficiently increased in density so as to cause it to coat on thickly and rapidly, thus decreasing the danger of disorganization from violent boiling, and shortening materially the time during which the solids are subjected to the heat of the drying surface.

The moisture of the concentrated or condensed milk is removed gently, and with such quickness owing to its reduced quantity as to prevent disorganization of the dried solids by temperatures which would impair them if in their original dilute state.

The process will be described as carried out in the desiccation of whole milk in connection with the accompanying drawings wherein—

Figure 1 is a diagrammatic view of an apparatus for carrying out our improved process, portions of said apparatus being shown in section. Figs. 2 and 3 are sectional views taken respectively on lines 2—2, and 3—3, Fig. 1. Fig. 4 is an end view of the driving gears for operating the cylinders and rotary feeding gate.

The milk to be treated is first placed in a reservoir 1, where its temperature is raised by means of the heating coils 2, after which the milk is taken from the reservoir 1, through a valved conduit 3, into an evaporating pan 4, in which a partial vacuum is maintained by means of a vacuum pump 5, to extract moisture from the milk.

The flow of the milk from the supply tank 1, to the vacuum pan 4, is regulated by a valve 6. The base of the vacuum pan 4, is provided with a steam chamber 7, which is connected by a valved conduit 8, to a steam generator (not shown), and in addition to this, the milk is further heated by a steam coil 9, which is located within the base of the vacuum pan and is connected by a conduit 10, to the same steam generator. The vacuum pan is, as usual, provided with a thermometer 11; a test cock 12; sight glass 13, and air vent 14, the purpose of which is well known.

The vacuum-pump 5, is connected by a conduit 15, to the dome of the vacuum-pan and serves the purpose of withdrawing the moisture-vapor from the milk, which latter, is allowed to flow out through a valved conduit 16, into a hopper 17. This hopper is provided with a laterally extending conduit 18, communicating with a sub-chamber 19, in which is movable a rotary feed-valve or gate 20, as best seen in Figs. 1 and 2, the gate of which slides radially in the shaft A which carries it.

The chamber 19, is provided with a pendant discharge-mouth 21, terminating at its lower end between, and discharging upon the peripheries of a pair of cylinders 22. These cylinders are comparatively long axially, and are driven in the direction indicated by arrow X, by intermeshing gears 23, so as to feed the condensed milk discharged through the mouth 21, downwardly between the cylinders. The contiguous faces of these cylinders travel practically in close contact with each other, except when forced apart by the drying milk, and together with the pieces 24, form a pocket for the reception of the milk, the end pieces 24, being impinged against the ends of the cylinders by adjusting screws 25, to prevent the escape of the milk at the ends of the pocket.

Steam is admitted to each of the cylinders by any available source of supply through axial conduits 27, and the water of condensation is removed from the ends of the cylinders by similar axial conduits 28, as best shown in Fig. 3. By this way of introducing steam into the cylinders the latter may be heated to the desired degree above the boiling point of water causing the milk from which the moisture has been removed to adhere to the peripheries of the cylinders by which the milk is carried downwardly and then upwardly, and is finally removed by suitable knives or scrapers 29, which are adjustably mounted on vertically adjustable supports 30, so that the cutting edges of the knives may be brought firmly into contact with the peripheries of their respective cylinders for removing the milk solids adhering thereto.

The valve chamber 19, and its rotary valve 20, and also the mouth 21, are substantially coextensive with the length of the cylinders 22, the rotary valve 20, serving to hold the greater part of the milk back in the conduit 18, and to forcibly eject it in regulated and limited predetermined quantities through the mouth 21, and against the peripheries of the cylinders 22, thereby forcibly feeding the milk in a thin sheet of uniform thickness from end to end of the cylinder.

By reducing the milk to a comparatively thick viscid consistency, by first removing a large part of its moisture, and then forcing it under the pressure of the rotary valve 20, in a thin regulated sheet between and against the peripheries of the cylinders 22, it will more readily and at once adhere to the heating surface of said cylinders and at the same time it is more easily and expeditiously removed from said cylinders by the scrapers 29.

The discharge mouth 21, the chamber 19, and the conduit 18, are protected by a sheet metal jacket 32, which is open at its ends to the atmosphere and is separated from the walls of the conduit chamber 19, and nozzle 21, to form ample intervening space for the free circulation of air to keep said walls sufficiently cool to prevent undue heating of the milk while being fed to the heated cylinder 22.

The moisture which is evaporated from the milk by contact with the cylinders 22, is allowed to escape upwardly into the surrounding hood 35, which is outside of the jacket 32, and which communicates with the atmosphere separately from the jacket 32.

The circulation of air through the jacket 32, produces a cooling effect upon said jacket which causes more or less water of condensation to collect upon its exterior surface, and in order that this water of condensation may be prevented from dripping onto the surface of the cylinders, said jacket is provided with suitable troughs 36, running along its entire sides and discharging at the ends of the rollers beyond the hood 35.

Rotary motion is transmitted from the driving shaft of one of the cylinders 22, to the gate or valve 20, by means of gears 40, as best seen in Figs. 2, 3, and 4, the speed of action of said gate being regulated by said gears to feed such quantities of milk as may be efficiently evaporated by contact with the heating cylinders.

By first concentrating or condensing the milk it is rendered viscid, and by depositing it between the cylinders at the angle which is most acute, and by feeding a predetermined regulated uniform amount in a thin sheet at this point, it is grasped and drawn downward by friction by the cylinders to which it at once adheres, and is dried before it has time to become sufficiently heated to form a steam cushion between the cylinders and the milk.

While a particular apparatus has been shown and described for carrying out the process, various other forms of apparatus may be employed whereby a sheet of previously concentrated or condensed milk may be delivered upon the heated surface of a cylinder in such manner that the milk is caused to adhere at once to the heated surface without changing the natural properties of the solids which are removed from the surface of the cylinder in the form of dry commercial flakes without discoloration or overheating.

The milk is first concentrated or condensed by removing part of its moisture by any suitable means at such a low temperature as not to affect its characteristics (say at about 130 degrees Fahrenheit and substantially below 212 degrees), such as *in vacuo*, or by blowing dry air heated to such temperature through the milk. This condensation is continued until the milk has been reduced as much as practicable with the apparatus employed. If a vacuum pan is used, it is best to reduce the milk to about twenty-five per centum of its original bulk, at which density it is still in a fluid state and may be easily removed from the vacuum pan. We have, however, utilized milk containing less than forty per centum of water, reduced to this condition by blowing heated dry air through it. We do not wish, however, to be confined exclusively to either of these processes for removing part of the moisture content of milk, for it is only necessary to reduce the moisture content as far as possible by any apparatus suited to the nature of the milk.

For concentrating or condensing milk we prefer a vacuum pan, as it is easily and cheaply operated and condenses the milk sufficiently for the purposes of our process. The condensed milk is then drawn in a film on to a heated surface, which may be either exposed to atmospheric pressure, or inclosed and subjected to the minus pressure of a vacuum. In case the surface is exposed to atmospheric pressure, it is desirable to heat the surface above 212 degrees Fahrenheit; in other words, to a temperature which would maintain ebullition in water. In case the surface is inclosed and subjected to a minus pressure, the minus pressure and the temperature should be so adjusted that water would boil if applied to the heated surface.

The viscidity of the condensed milk causes it to adhere at once in a thin film to the heated cylinders, so that the formation of a steam cushion between the milk solids and the cylinders is prevented. The film is subsequently scraped off from the heated cylinders, its moisture-content having been practically vaporized and eliminated while in contact with the cylinders, so that the solids when scraped from the heated cylinders are practically dry. The produced dried milk differs materially from that produced by rapidly boiling the normal thin milk upon a heated surface in the open air at 212 degrees Fahrenheit or above, and also from that produced by rapidly boiling the normal thin milk upon a heated surface *in vacuo*; for without concentration, if the milk is completely reduced to dryness some of the water of crystallization is driven off from the milk-sugar and is re-absorbed after the material has been scraped from the heated surface, giving the dry solids a tendency to cake. The driving off of this water of crystallization of the milk sugar has a tendency to cause the film of milk solids to cling tenaciously to the heated surface. In contrast to this, in our process, the film of milk solids does not cling tenaciously to the heated surface, but flakes off and separates easily.

In case the milk should be highly acid, it is desirable to neutralize this acid with slaked lime or other suitable alkali to prevent the pecipitation of the casein of the milk during the condensing and drying process, due to the concentration of the lactic acid which is non-volatile. Such methods are commonly known and do not need to be here described. It is not necessary to neutralize the acidity which ordinarily exists in milk of good quality, received promptly after milking and properly cared for to prevent the increase of acid. A perfect film is formed without the neutralization of the natural acidity of the milk. The product is not quite as soluble as that made from neutralized milk, but, for many uses of the dried milk, deficiency in solubility is not detrimental. We also find it desirable to fix the butterfat in whole milk by means of an emulsifier or homogenizer, several forms of which are in common use. This keeps the butterfat in globular form during the condensation and the drying and prevents the rendering of the butterfat and consequent occlusion of the casein or other constituents of the milk by the melted fat, which injures the solubility of the dried milk solids.

The preliminary condensation of the milk enables the evaporating machine to be used with efficiency and economy. The equivalent of from twenty-five hundred to three thousand pounds of normal milk can be dried in one hour by a single machine with a pair of cylinders 5 feet long, and 28 inches in diameter, and rotating at the rate of 6 revolutions a minute.

We claim:

1. The process of desiccating milk and recovering its constituent solids in dried form which consists, first, in reducing the moisture content *in vacuo* at a temperature below 212 degrees Fahrenheit, to render the milk viscid; subsequently forcibly ejecting the viscid condensed milk in a thin sheet in regulated and predetermined quantities upon rotating cylinders heated above the boiling point of water, the viscosity of the milk causing it to adhere at once to the heated cylinders, whereby the formation of a steam cushion between the solids and the cylinders is prevented; evaporating substantially all the remaining moisture while the milk is in contact with such cylinders; and finally removing the dried solids from said cylinders.

2. The process of desiccating milk and recovering its constituent solids in dried form which consists, first, in reducing the moisture content at a temperature below 212 degrees Fahrenheit to render the milk viscid; subsequently feeding the viscid condensed milk in a thin regulated sheet upon a heated surface, the viscosity of the milk causing it to adhere at once to the heated surface, whereby the formation of a steam cushion between the solids and the surface is prevented; evaporating substantially all the remaining moisture while the milk is in contact with such surface; and finally removing the dried solids from said surface.

3. The process of desiccating milk and recovering its constituent solids in dried form which consists, first, in reducing the moisture content at a temperature below 212 degrees Fahrenheit to render the milk viscid; subsequently feeding the viscid condensed milk upon a heated surface, the viscosity of the milk causing it to adhere at once to the heated surface, whereby the formation of a steam cushion between the solids and the surface is prevented; evaporating substantially all the remaining moisture while the milk is in contact with such surface; and finally removing the dried solids from said surface.

In witness whereof we have hereunto set our hands on this 27th day of April, 1911.

LEWIS C. MERRELL.
IRVING S. MERRELL.

Witnesses:
HOWARD P. DENISTON,
E. F. SPEARING.